(12) United States Patent
Shimomura et al.

(10) Patent No.: US 7,126,625 B2
(45) Date of Patent: Oct. 24, 2006

(54) OPTICAL SCANNING DEVICE AND IMAGE FORMING APPARATUS USING THE SAME

(75) Inventors: Hidekazu Shimomura, Kanagawa (JP); Ken Tanimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 10/921,853

(22) Filed: Aug. 20, 2004

(65) Prior Publication Data

US 2005/0045814 A1    Mar. 3, 2005

(30) Foreign Application Priority Data

Aug. 27, 2003 (JP) ............................. 2003-208957

(51) Int. Cl.
*B41J 27/00* (2006.01)
(52) U.S. Cl. ...................... 347/244; 347/258
(58) Field of Classification Search ........ 347/224–225, 347/233–235, 241–244, 248–250, 256–258; 359/565–566, 563; 372/50.1, 50.11; 385/10
See application file for complete search history.

(56) References Cited

U.S. PATENT DOCUMENTS

| 4,936,665 | A |  | 6/1990 | Whitney |
| 5,148,314 | A |  | 9/1992 | Chen |
| 5,260,828 | A |  | 11/1993 | Londono et al. |
| 5,589,982 | A | * | 12/1996 | Faklis et al. ................. 359/565 |
| 6,067,106 | A | * | 5/2000 | Ishibe et al. ................. 347/258 |
| 6,094,286 | A |  | 7/2000 | Kato |
| 6,124,962 | A |  | 9/2000 | Kamikubo |
| 6,259,547 | B1 |  | 7/2001 | Kamikubo .................. 359/205 |
| 6,603,500 | B1 | * | 8/2003 | Kato ........................... 347/258 |
| 2002/0044357 | A1 | * | 4/2002 | Shimomura ................. 359/566 |

FOREIGN PATENT DOCUMENTS

| JP | 10-68903 | 3/1998 |
| JP | 10-197820 | 7/1998 |

\* cited by examiner

*Primary Examiner*—Hai Pham
(74) *Attorney, Agent, or Firm*—Fitzpatrick, Cella, Harper & Scinto

(57) ABSTRACT

There is provided a diffraction grid which is easily produced without reducing a grid size. There is provided an optical scanning device having effects such as a chromatic aberration correction and a temperature compensation even when a short wavelength light source having a wavelength of 500 nm or less is used, and an image forming apparatus using the optical scanning device. In the optical scanning device having the diffraction grid, for which the short wavelength light source having a wavelength of 500 nm or less is used, a design order of the diffraction grid is set to a diffraction order equal to or larger than a second order to obtain a grid shape which is easily formed.

15 Claims, 12 Drawing Sheets

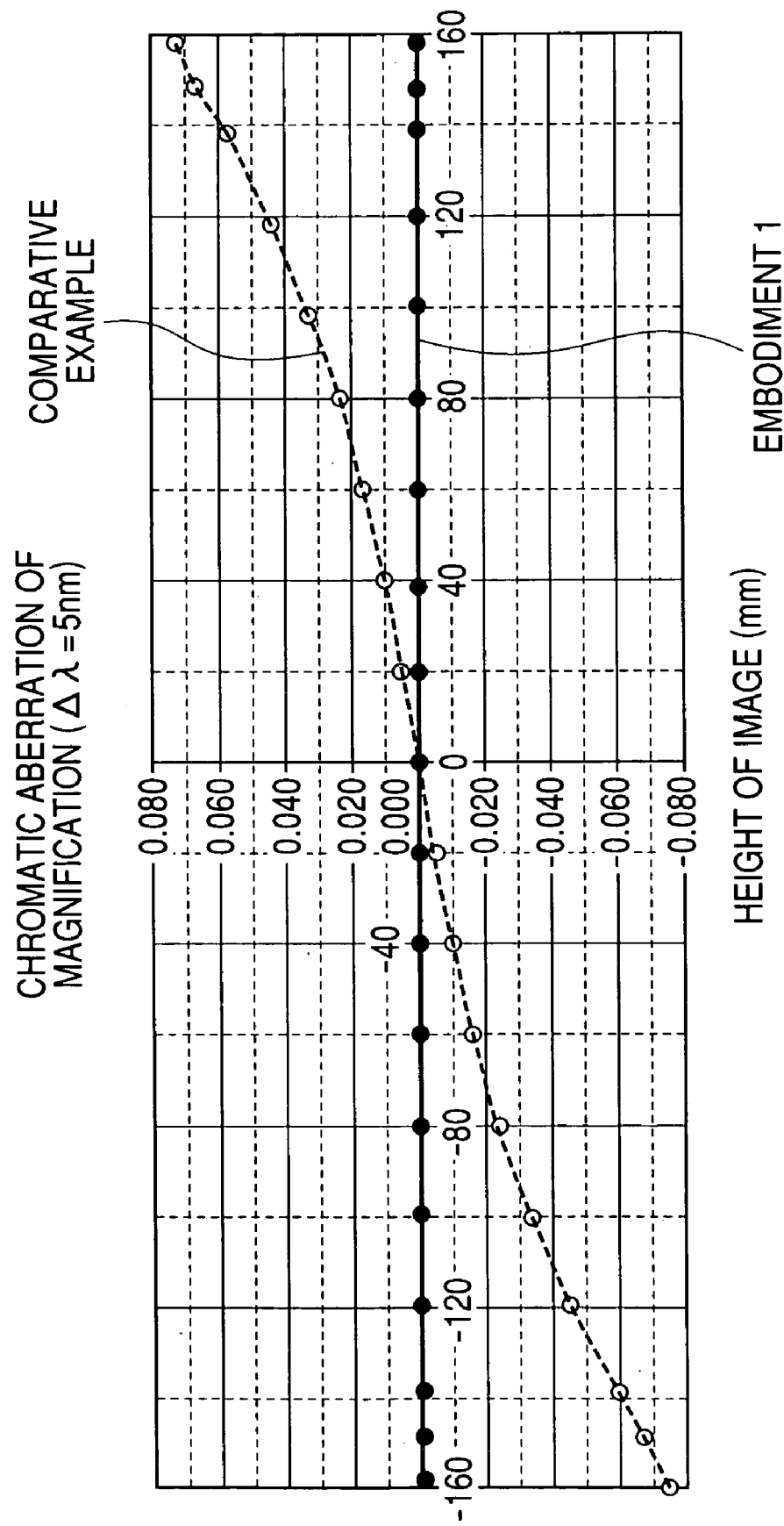

PRIOR ART
FIG. 15A
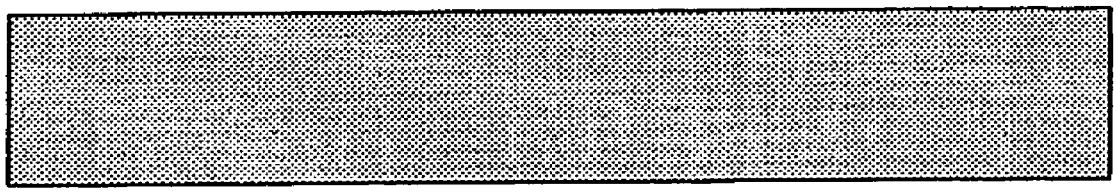
PRIOR ART
FIG. 15B
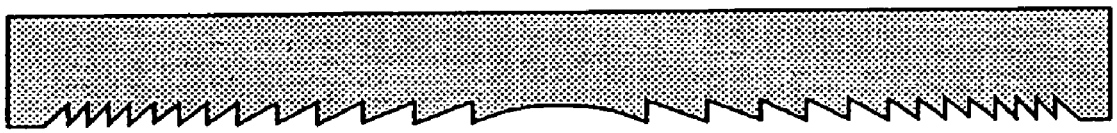

OPTICAL SCANNING DEVICE AND IMAGE FORMING APPARATUS USING THE SAME

BACKGROUND OF THE INVENTION

1. Field of the Invention

The present invention relates to an optical scanning device and an image forming apparatus using the same. In particular, the present invention relates to an optical scanning device that is suitably used for an apparatus such as a laser beam printer or a digital copying machine having an electrophotographic process, in which a light flux optically modulated and emitted from light source means is reflected and deflected on a polygon mirror serving as optical deflection means and then a surface to be scanned is scanned with the light flux through a scanning optical system to record image information. The present invention relates to an optical scanning device capable of providing a satisfactory image by adopting a diffraction grid for correction of chromatic aberration of magnification or temperature compensation and to an image forming apparatus using the same. In addition, the present invention relates to a color image forming apparatus which uses a plurality of optical scanning devices and is composed of a plurality of image bearing members corresponding to respective colors.

2. Related Background Art

Up to now, in an optical scanning device used for a laser beam printer (LBP) or the like, a light flux optically modulated according to an image signal and emitted from light source means is periodically deflected by, for example, an optical deflector composed of a rotating polygonal mirror (polygon mirror). The deflected light flux is converged to form a spot shape on a photosensitive recording medium (photosensitive drum) by a scanning optical system having an fθ characteristic. The surface of the recording medium is scanned with the light flux to perform image recording.

FIG. 13 is a schematic view showing a main part of a conventional optical scanning device.

In FIG. 13, a divergent light flux emitted from a light source means 1 is converted into a substantially parallel light flux by a collimator lens 3. The substantially parallel light flux is limited by a diaphragm 2 and incident into a cylindrical lens 4 having predetermined refractive power only in the sub scanning direction. Of the substantially parallel light fluxes incident into the cylindrical lens 4, the light flux within a main scanning section outgoes therefrom without changing an optical state. The light flux within a sub scanning section is converged and imaged as a substantial linear image onto a deflection surface (reflection surface) 5a of a deflecting means 5 composed of a polygon mirror.

The light flux which is deflected on the deflection surface 5a of the deflecting means 5 is guided onto a photosensitive drum surface 8 serving as a surface to be scanned through a scanning optical system 6 having an fθ characteristic. By rotating the deflecting means 5 in a direction indicated by an arrow "A", the photosensitive drum surface 8 is scanned with the light flux in a direction indicated by an arrow "B" to record image information.

Further, in order to achieve high speed scanning, a multi-beam optical scanning device that simultaneously forms a plurality of scanning lines by light fluxes from a plurality of light sources has been proposed and commercially available from various companies. FIG. 14 is a schematic view showing a main part of a multi-beam optical scanning device. Two light fluxes emitted from light sources 81 and 82 are converted into parallel light fluxes by collimator lenses 83 and 84 and then synthesized into one by a synthesizing optical element 85. The synthesized light flux forms a linear image extended in the main scanning direction near a deflection surface of a polygon mirror 87 by the action of a cylindrical lens 86 and then forms a light spot on a photosensitive drum 89 by a scanning optical system 88. Therefore, the two scanning lines can be formed by performing optical scanning once, so that extremely high speed scanning can be achieved as compared with a conventional optical scanning device. With respect to a multi-beam light source other than one using the above-mentioned synthesizing optical element, a monolithic multi-beam laser in which a large number of light emitting points exist has been produced. In the case where the monolithic multi-beam laser is used, it is unnecessary to use the synthesizing optical element. Thus, it is possible to simplify the optical system and the optical adjustment.

In an optical scanning device using a multi-beam light source, in order to eliminate a jitter caused by a wavelength difference between a plurality of light sources (variation in interval between scanning lines on the photosensitive drum surface in the main scanning direction), any countermeasure such as the appropriate selection of the light sources has been taken so as to minimize the wavelength difference between the light sources. When the jitter caused by the wavelength difference between the light sources (chromatic aberration of magnification) is corrected by the scanning optical system, a plurality of lenses having different dispersion characteristics are required. As compared with a scanning optical system that does not correct the chromatic aberration of magnification, the number of lenses generally increases to cause an increase in cost. There is a limitation with respect to the range of selection of the wavelengths of the light sources. Therefore, it is difficult that the wavelengths are made completely equal to one another. There is a problem with respect to a cost for the selection of the wavelengths. When a semiconductor laser is activated, an image quality is deteriorated by a variation in wavelength, which is called mode hopping. Thus, even in an optical scanning device other than the optical scanning device using the multi-beam light source, in order to improve the stability of the image quality, it is necessary to minimize the jitter caused by the variation in wavelength.

A semiconductor laser used as a conventional light source (as disclosed in, for example, Japanese Patent Application Laid-Open No. H10-197820 and Japanese Patent Application Laid-Open No. H10-068903) is an infrared laser (780 nm) or a visible laser (675 nm). However, in order to realize a high resolution, the development of an optical scanning device in which a minute spot shape is obtained by using a short wavelength laser having an oscillating wavelength of 500 nm or less is under way. The advantage of the use of the short wavelength laser is that a minute spot size which is about half of a conventional spot size can be achieved while an exit F number of the scanning optical system is kept equal to a conventional one. In the case where a spot size is reduced to half of the conventional spot size while using the infrared laser, it is necessary to increase the intensity of the scanning optical system to an intensity about two times larger than that in a conventional case. A focal depth is proportional to a wavelength of a used light source and to the square of the exit F number of the scanning optical system. Therefore, to obtain the same spot size, the focal depth in the infrared laser becomes equal to or smaller than about ½ of the focal depth in the short wavelength laser.

In such an optical scanning device, in order to record image information with high precision, it is necessary to preferably correct a curvature of field over the entire surface to be scanned, to have a distortion characteristic (fθ characteristic) with a constant speed, between an angle of view θ and an image height Y, and to make spot sizes on the image plane uniform at respective image heights. Various optical scanning devices or various scanning optical systems that satisfy the optical characteristics like those have been proposed up to now.

According to Japanese Patent Application Laid-Open No. H10-197820 and Japanese Patent Application Laid-Open No. H10-068903 as described above, a (temperature compensation) optical scanning device using a diffraction optical element for a scanning optical system has been proposed to reduce a focal variation on a surface to be scanned due to the correction of the chromatic aberration of magnification and an environmental variation.

In particular, in an optical scanning device using a short wavelength light source having a wavelength of 500 nm or less, a dispersion characteristic of a material used for a scanning lens is large. Therefore, the chromatic aberration of magnification becomes six times or seven times larger than that in a conventional infrared laser. Thus, in the optical scanning device using the multi-beam laser, the jitter is significantly caused in the main scanning direction to reduce the image quality.

When a blue-violet laser which is made of a material such as gallium nitride and oscillated at the wavelength of 405 nm is used to obtain a spot size which is about half of a spot size of the infrared laser, as described above, the focal depth is proportional to the wavelength. Therefore, only a depth about half the conventional depth can be allowed. Thus, along with the improvement of precision of respective parts composing the optical scanning device, a (temperature compensation) optical scanning device in which the focal variation is not caused even in the case of the environmental variation is desired.

As described below, a phase function φ for determining a grid shape is inversely proportional to the wavelength. Therefore, when a diffraction grid having the same power is designed, a grid pitch of the short wavelength laser having 500 nm or less becomes smaller than that of the conventional infrared laser.

For the above-mentioned reason, when a light flux having a short wavelength of 500 nm or less is imaged on the surface to be scanned in the optical scanning device using the short wavelength light source having a wavelength of 500 nm or less, there is a problem in that a grid size becomes smaller.

In general, as shown in FIG. 15A, a grid shape formed on a mold by mold forming is transferred to an optical resin member or an optical glass member. After that, as shown in FIG. 15B, the transferred grid shape is separated from the mold to produce the diffraction optical element. Alternatively, a method of dropping a small amount of ultraviolet curable resin on a glass substrate (lens can be also used) serving as a base and curing the grid shape similarly formed on the mold by ultraviolet light is used.

However, as the grid size becomes smaller, the following problems are caused:

it is hard to produce the mold by a cutting tool;

transfer property of the grid shape formed on the mold deteriorates; and along with the deterioration of the transfer property, an imaging performance deteriorates and a diffraction efficiency reduces.

SUMMARY OF THE INVENTION

An object of the present invention is to provide a diffraction grid which can be used for an optical scanning device and easily produced by selecting a suitable design order of the diffraction grid. Another object of the present invention is to provide a diffraction grid that attains a preferable performance even when a short wavelength light source having a wavelength of 500 nm or less is used. Still another object of the present invention is to provide an optical scanning device using the diffraction grid, which has functions such as a chromatic aberration correction and a temperature compensation, and an image forming apparatus using the optical scanning device.

According to one aspect of the present invention, an optical scanning device includes:

light source means for emitting at least one light flux having a wavelength of 500 nm or less;

deflecting means for deflecting the at least one light flux emitted from the light source means;

a first optical system for guiding the light flux emitted from the light source means to the deflecting means; and a second optical system for imaging the light flux deflected by the deflecting means on a surface to be scanned, in which one of the first optical system and the second optical system includes a diffraction grid and a design order of the diffraction grid is set to a diffraction order equal to or larger than a second order.

Also, according to another aspect of the present invention, an optical scanning device includes:

light source means for emitting at least one light flux having a wavelength of 500 nm or less;

deflecting means for deflecting the at least one light flux emitted from the light source means;

a first optical system for guiding the light flux emitted from the light source means to the deflecting means; and a second optical system for imaging the light flux deflected by the deflecting means on a surface to be scanned, in which:

one of the first optical system and the second optical system includes a diffraction grid; and provided that the total number of grids of the diffraction grid is represented by m, an effective range of the diffraction grid is represented by L (mm), a minimum grid pitch of the diffraction grid is represented by P (μm), and the wavelength of the light flux is represented by λ (μm), the following expressions are satisfied:

$$m \cdot L \cdot \lambda < 300000 \quad (1)$$

$$30 < P/\lambda \quad (2)$$

In further aspect of the optical scanning device, provided that a diffraction order of the diffraction grid is represented by k, the wavelength of the light flux is represented by λ (μm), and a refraction index of a material composing the diffraction grid is represented by n, the following expression may be satisfied:

$$1 < k \cdot \lambda/(n-1) < 5 \quad (3)$$

BRIEF DESCRIPTION OF THE DRAWINGS

FIG. 6 is a graph showing a chromatic aberration of magnification of a scanning optical system in a main scanning direction in the first embodiment of the present invention;

FIGS. 15A and 15B are explanatory views showing a process for forming a diffraction optical element.

DETAILED DESCRIPTION OF THE PREFERRED EMBODIMENTS (First Embodiment)

Figure 1:
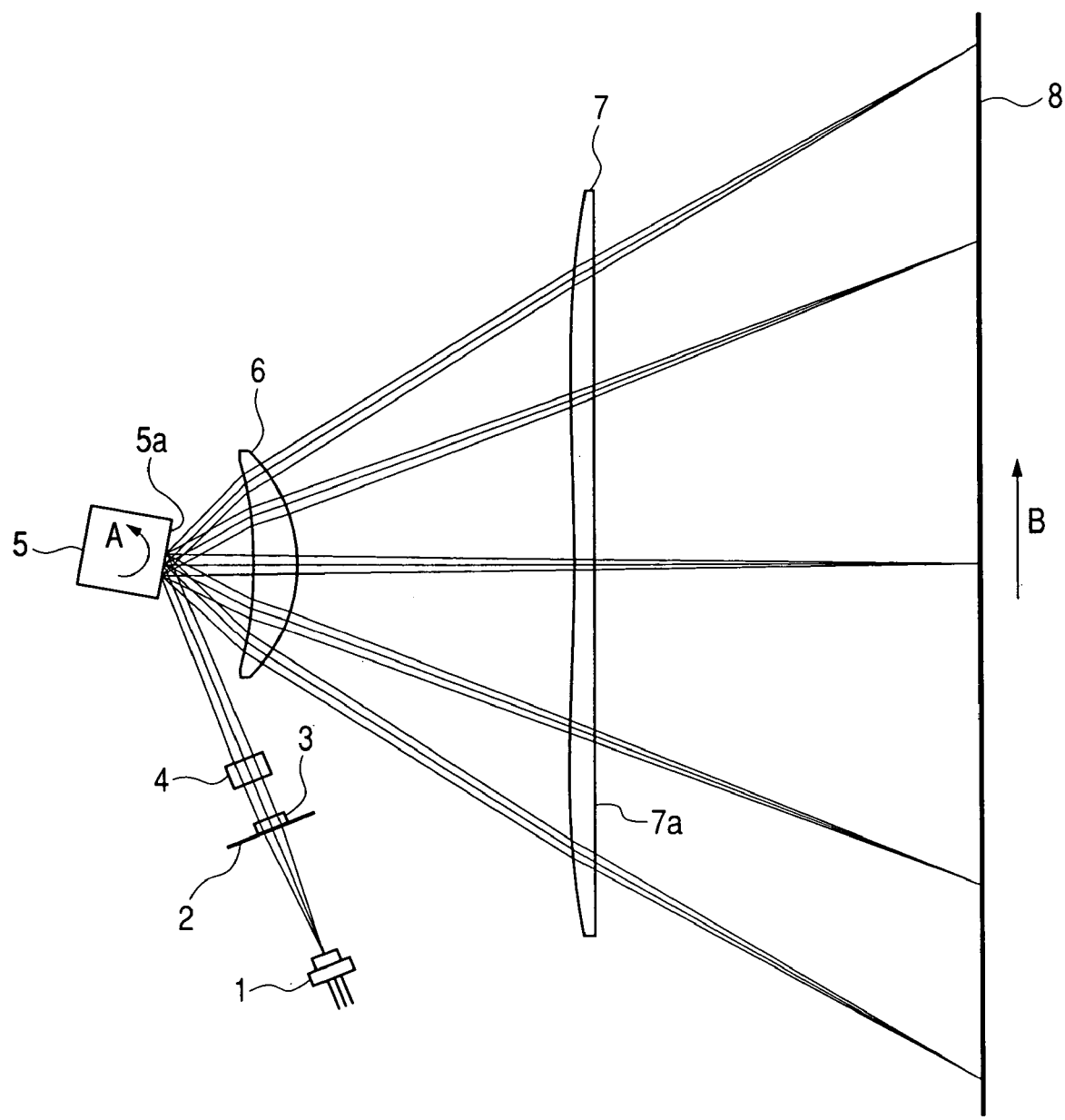
FIG. 1 is a main scanning sectional view showing an optical scanning device according to a first embodiment of the present invention.

FIG. 1 is a main scanning sectional view showing an optical scanning device according to a first embodiment of the present invention.

Here, a main scanning direction indicates a direction perpendicular to the rotational axis of deflecting means. A sub scanning direction indicates a direction parallel to the rotational axis of the deflecting means. In addition, a main scanning section indicates a plane which is parallel to the main scanning direction and includes the optical axes of a deflection optical element (lens) 6 and a diffraction optical element (lens) 7 having a diffraction grid 7a formed on an exit surface of a diffraction part, which compose a scanning optical system.

A divergent light flux emitted from a single beam semiconductor laser 1 serving as light source means is limited by a diaphragm 2 so as to reduce a width of the light flux, thereby obtaining a desirable spot size. Then, the light flux is converted into a substantially parallel light flux by a collimator lens 3. The substantially parallel light flux is imaged as a linear image extended in the main scanning direction onto the vicinity of a deflection surface 5a of a deflecting means 5 described later by a cylindrical lens 4 having predetermined refractive power in only the sub scanning direction. The deflecting means 5 is composed of, for example, a polygon mirror having four surfaces (rotating polygonal mirror) and rotated in a direction indicated by an arrow "A" in FIG. 1 at a constant rate by drive means such as a motor (not shown). With the scanning optical system composed of the deflection optical element (lens) 6 and the diffraction optical element (lens) 7 having fθ characteristics, the deflection light flux which is reflected and deflected on the deflecting means 5 is imaged onto a photosensitive drum surface 8 serving as a surface to be scanned. In addition, a tangle error of the deflection surface 5a of the deflecting means 5 is corrected by the scanning optical systems. At this time, the deflection light flux which is reflected and deflected on the deflection surface 5a of the deflecting means 5 is guided onto the photosensitive drum surface 8 through the deflection optical element (lens) 6 and the diffraction optical element (lens) 7. When the polygon mirror 5 is rotated in a direction indicated by an arrow "A", the photosensitive drum surface 8 is optically scanned in a direction indicated by an arrow "B". Therefore, scanning lines are formed on the photosensitive drum surface 8, thereby performing image recording.

Here, an optical arrangement and figures in this embodiment are shown in Table 2.

A shape of each generating line of the incident and exit surfaces of the deflection optical element (lens) 6 and the incident surface of the diffraction optical element (lens) 7 is based on an aspherical shape which can be indicated as a function of up to the tenth order. For example, in the case where an intersection point between the deflection optical element (lens) 6 and the optical axis is set to an origin, the optical axis direction is set to an X-axis, and an axis perpendicular to the optical axis within the main scanning section is set to an Y-axis, a generating line direction corresponding to the main scanning direction is indicated by the expression, $$X = \frac{\frac{Y^2}{R}}{1 + \sqrt{1-(1+k)\left(\frac{Y}{R}\right)^2}} + B4 \times Y^4 + B6 \times Y^6 + B8 \times Y^8 + B10 \times Y^{10}$$

(where R is a curvature radius of a generating line and K, B4, B6, B8, and B10 are aspherical coefficients).

In addition, a meridian direction corresponding to the sub scanning direction is indicated by the expression, $$S = \frac{\frac{Z^2}{Rs^*}}{1 + \sqrt{1-\left(\frac{Z}{Rs^*}\right)^2}}$$

S indicates a shape of a meridian line which includes a normal of the generating line at each position in the generating direction and is defined within a plane perpendicular to the main scanning surface.

Here, a curvature radius in the sub scanning direction (meridian line curvature radius) Rs* at a position away from the optical axis by Y in the main scanning direction is indicated by the expression, $$Rs^* = Rs \times (1 + D2 \times Y^2 + D4 \times Y^4 + D6 \times Y^6 + D8 \times Y^8 + D10 \times Y^{10})$$

(where Rs is the meridian line curvature radius on the optical axis and D2, D4, D6, D8, and D10 are meridian line change coefficients).

Note that the figure is defined by the above-mentioned expressions in this embodiment. However, the scope of the present invention is not limited to this.

In the diffraction optical element 7, the diffraction grid 7a is formed on the exit surface side of the refraction portion having the fθ characteristic and the grid shape thereof is defined by the following phase function. That is, the grid shape is expressed by the following expression related to the diffraction surface indicated by a phase function of up to a tenth order in the main scanning direction and a phase function of a second order in the sub-scanning direction, which is changed according to a position in the main scanning direction, $$\varphi = 2\pi k/\lambda \{b2Y^2 + b4Y^4 + b6Y^6 + b8Y^8 + b10Y^{10} + (d0 + d1Y + d2Y^2 + d3Y^3 + d4Y^4 + d5Y^5 + d6Y^6)Z^2\}$$

(where $\phi$ is a phase function, k is a diffraction order, $\lambda$ is a design wavelength (405 nm), Y is a height from a lens optical axis, and b2, b4, b6, b8, b10, d0, d1, d2, d3, d4, d5, and d6 each is a phase coefficient, secondary diffraction light being used in this embodiment).

Table 1 shows design parameters of the optical system of the optical scanning apparatus shown in FIG. 1. The lens 6 is the defection optical element and the lens 7 is the diffraction optical element in which the diffraction grid is provided on the deflection base surface.

Table 2 shows phase coefficients, the total number of grids m within an effective range L, and a minimum pitch P of grids.

TABLE 2

| Coefficient | Order | Primary diffraction light | Secondary diffraction light |
|---|---|---|---|
| | | Main scanning phase coefficient & Grid pitch | |
| b2 | y2 | −2.039480E−04 | −1.01974.E−04 |
| b4 | y4 | 4.183050E−09 | 2.09153.E−09 |
| b6 | y6 | −6.913380E−13 | −3.45669.E−13 |
| b8 | y8 | 5.182780E−17 | 2.59139.E−17 |
| b10 | y10 | −1.637130E−21 | −8.18565.E−22 |
| Total grid number m | | 5680 | 2840 |
| Effective width (mm) | | 216 | 216 |
| Minimum pitch (mm) | | 0.0089 | 0.0178 |
| | | Sub scanning phase coefficient & Grid pitch | |
| d0 | z2 | −6.75868E−03 | −3.379340.E−03 |
| d1 | z2y | 9.16976E−07 | 4.584880.E−07 |
| d2 | z2y2 | 1.68720E−07 | 8.436000.E−08 |
| d3 | z2y3 | −3.60713E−11 | −1.803565.E−11 |
| d4 | z2y4 | −5.48134E−12 | −2.740670.E−12 |
| d5 | z2y6 | 8.82193E−17 | 4.410965.E−17 |
| Total grid number m | | 150 | 75 |
| Effective width (mm) | | 6 | 6 |
| Minimum pitch (mm) | | 0.0100 | 0.0201 |

TABLE 1

Design data

| Wavelength, Refractive index | | | Lens 6 Figures | | | Lens 7 Figures | |
|---|---|---|---|---|---|---|---|
| Use wavelength | λ (nm) | 405 | First plane | Second plane | | First plane | Second plane |
| Lens 6 Refractive index | n₄₀₅ | 1.5466198 | R −8.74966E+01 | −4.71453E+01 | R | −4.04355E+02 | ∞ |
| | | | K 5.71925E−01 | −1.04001E+00 | K | −3.69841E+01 | |
| Lens 7 Refractive index | n₄₀₅ | 1.5466198 | B4 1.40393E−06 | 9.40875E−08 | B4 | 2.07946E−07 | |
| | | | B6 1.26075E−09 | 5.42879E−10 | B6 | −1.81403E−11 | |
| | | | B8 −1.16558E−12 | 4.08844E−13 | B8 | 8.57936E−16 | |
| Light beam angle | | | B10 1.96978E−16 | −4.10320E−16 | B10 | −1.82040E−20 | |
| Incident angle to polygon | θp | −70 | r0 1.43515E+02 | −3.21543E+01 | | Diffraction grid, Phase coefficient | |
| Maximal exit angle on polygon | θe | 45 | D2u | 2.46277E−04 | | First plane | Second plane |
| | | | D4u | −1.56775E−07 | b2 | | −1.01974E−04 |
| Arrangement | | | D6u | 7.89931E−11 | b4 | | 2.09153E−09 |
| Polygon surface to lens 6 | e1 | 30 | D2l | 1.86868E04 | b6 | | −3.45669E−13 |
| Central thickness of lens 6 | e2 | 11 | D4l | −1.07713E−07 | b8 | | 2.59139E−17 |
| Lens 6 to lens 7 | e3 | 75 | D6l | 5.27788E−11 | b10 | | −8.18565E−22 |
| Central thickness of lens 7 | e4 | 5 | Suffios u: Opposite Laser Side | | d0 | | −3.37934E−03 |
| Lens 7 to surface to be scanned | Sk | 111 | Suffios l: Laser Side | | d1 | | 4.58488E−07 |
| | | | Y-Axis Sign +: Laser Side | | d2 | | 8.43600E−08 |
| Polygon axis to surface to be scanned | L | 238.4 | | | d3 | | −1.80357E−11 |
| Effective scanning width | W | 297 | | | d4 | | −2.74067E−12 |
| | | | | | d5 | | 0.00000E+00 |
| | | | | | d6 | | 4.41097E−17 |

Figure 2:
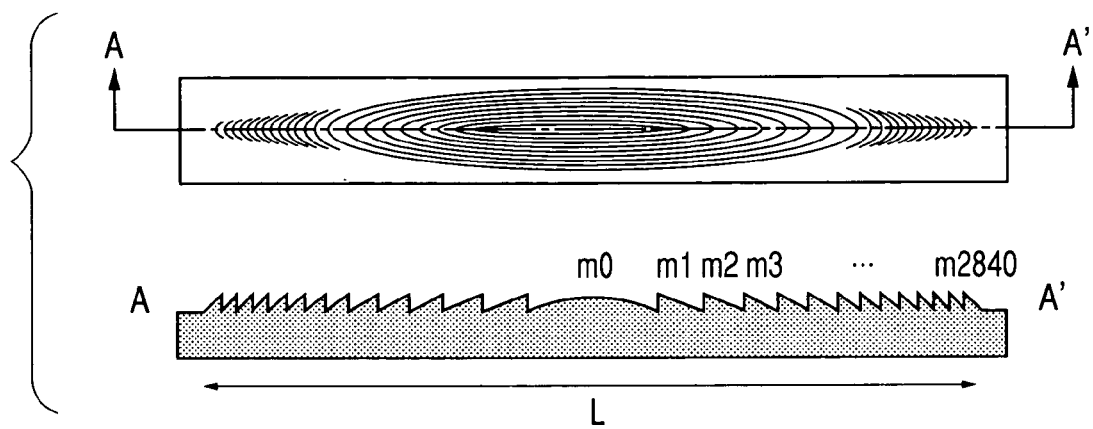
FIG. 2 shows a diffraction optical element in the first embodiment of the present invention.

FIG. 2 is a schematic view showing the diffraction optical element 7, in which the diffraction grid 7a is formed in a saw-tooth shape (blazed type) in the main scanning direction and the sub scanning direction.

In this embodiment, a short wavelength light source having λ=405 nm is used. In the entire scanning region, it is achieved that a spot diameter in the main scanning direction becomes 27 μm and a spot diameter in the sub scanning direction becomes 35 μm. Here, the spot diameter indicates a diameter of a region which is obtained by slicing at 1/e2 of a peak light amount.

Figure 3:
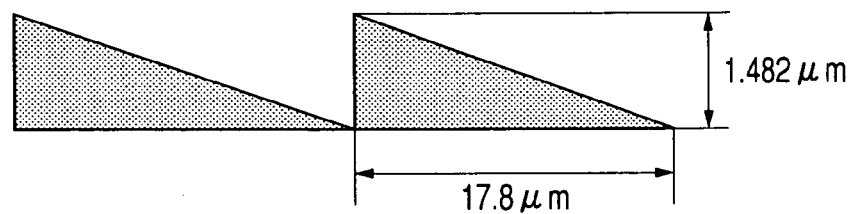
FIG. 3 is a sectional view showing a diffraction grid at a minimum pitch in the case using secondary diffraction light.
Figure 4:
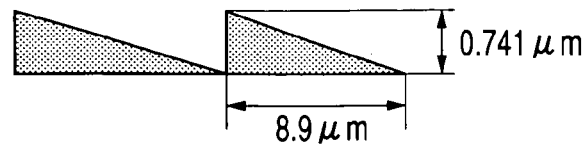
FIG. 4 is a sectional view showing a diffraction grid at a minimum pitch in the case using primary diffraction light.

FIG. 3 shows a grid shape at a minimum pitch in the case where the diffraction grid is designed using secondary diffraction light in this embodiment. For comparison with FIG. 3, FIG. 4 shows a grid shape at a minimum pitch in the case where the diffraction grid is designed using primary diffraction light. As is apparent from FIG. 4, in the case using the conventional primary diffraction light, a grid height becomes lower than 1 μm and the minimum pitch P becomes a half of that in the case using the secondary diffraction light. As is read from table 2, the total number of grids of the diffraction grid m becomes two times larger than that in the case using the secondary diffraction light.

As described above, the diffraction optical element 7 is designed using the secondary diffraction light. Therefore, it is possible to obtain the grid pitch which is about two times larger than that in the case using the primary diffraction light and the total number of grids which is about a half of that in the case using the primary diffraction light.

In other words, in this embodiment, with respect to a light flux having a wavelength of 500 nm or less, the diffraction order equal to or larger than the second order is used for diffraction light for forming an image on the surface to be scanned.

Figure 5A:
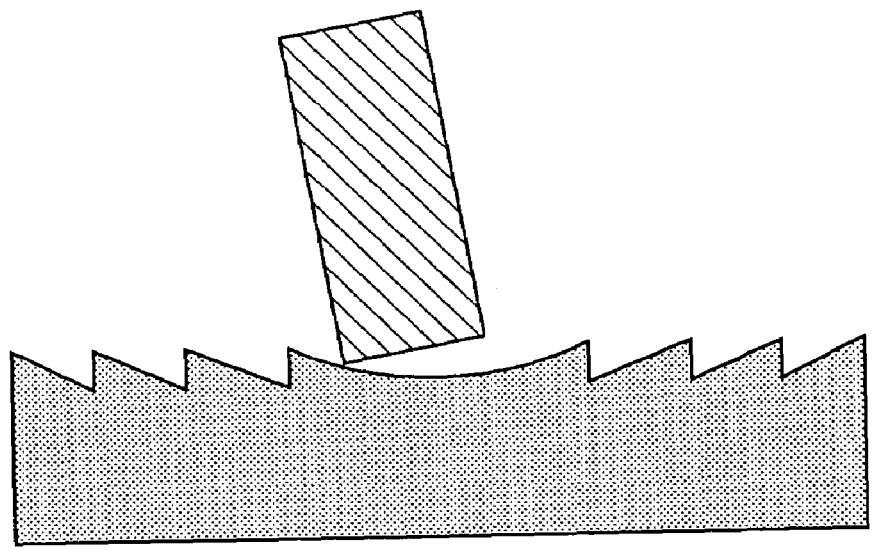
FIGS. 5A and 5B are explanatory views showing mold processing for the diffraction optical element.
Figure 5B:
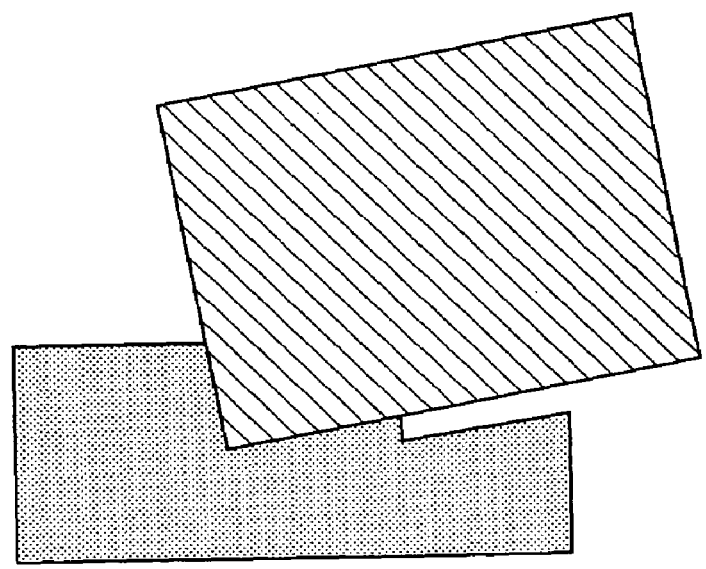

FIGS. 5A and 5B are explanatory views showing a mold cutting process for the diffraction optical element 7. With respect to a grid shape around a central portion of the diffraction optical element 7, because the grid pitch is relatively large, the central portion is cut plural times using an end portion of a cutting tool which is shaded (FIG. 5A). On the other hand, because the grid pitch in a peripheral portion of the diffraction optical element 7 is small, the peripheral portion is cut one time for each grid to obtain the grids each having an oblique surface (FIG. 5B). Mold processing is always performed on the diffraction optical element while the end portion of the cutting tool is damaged. The cutting tool is gradually worn during cutting. Therefore, a problem that a target grid shape cannot be obtained occurs.

As the number of grids and the effective width of the diffraction optical element become larger, the amount of wear of the cutting tool increases.

Therefore, in the case where the total number of grids of the diffraction optical element is represented by m, the effective range of the diffraction optical element is represented by L (mm), and the wavelength of the light source is represented by λ (μm), when $$m \cdot L \cdot \lambda < 300000 \quad (1)$$

is satisfied, a grid shape suitable to the wavelength of the used light source can be obtained.

Even when the grid pitch is small, a damage to the cutting tool becomes larger. Therefore, when the minimum pitch of the diffraction optical element is represented by P (μm), it is preferable to satisfy $$30 < P/\lambda \quad (2).$$

In this embodiment, $m \cdot L \cdot \lambda = 248443$ and $P/\lambda = 43.95$. Therefore, both Expression 1 and Expression 2 are satisfied.

When the diffraction order of the diffraction optical element is represented by k and a refraction index of a material composing the diffraction optical element is represented by n, a grid depth h necessary to set a diffraction efficiency to 100% at a use wavelength is expressed to be $h = k \cdot \lambda/(n-1)$.

When the grid depth is too shallow, processing precision is hard to improve. When the grid depth is too deep, the damage to the cutting tool becomes larger. Therefore, the diffraction order and the material are selected so as to satisfy $$1 < k \cdot \lambda/(n-1) < 5 \quad (3).$$

Thus, a grid shape suitable to the wavelength of the used light source can be obtained.

In the case of the diffraction grid using the short wavelength light source having a wavelength of 500 nm or less, it is desirable that the design order of the diffraction grid is the second order to the fifth order. When the diffraction order is the first order, as described above, the total number of grids is too large. When the diffraction order is equal to or larger than the sixth order, the grid depth becomes too deep, so that a cutting resistance of the cutting tool increases. In addition, when the diffraction grid has the diffraction order equal to or larger than the sixth order, significant influence is caused by a variation in diffraction efficiency due to a variation in grid depth.

In this embodiment, the diffraction order k is 2, λ is 0.405 (μm), and a refraction index $n_{405}$ of an optical resin composing the lens 7 is 1.54662. Therefore, $k \cdot \lambda/(n-1)$ becomes 1.4818 (μm), so that Expression 3 is satisfied.

Table 3 shows refraction indexes of optical resins used in the first to third embodiments. A chromatic aberration of magnification and a focal variation during an increase in temperature are calculated based on values shown in Table 3.

In this embodiment, the second diffraction order is used as the design order of the diffraction grid. Even when the design order equal to or larger than the third order is used, a diffraction grid which is easily produced without reducing a grid size can be provided. Even when the short wavelength light source having a wavelength of 500 nm or less is used, it is possible to provide an optical scanning device having functions such as a chromatic aberration correction and a temperature compensation, and an image forming apparatus using the optical scanning device.

Even in the second and third embodiments described below, the design order equal to or larger than the third order may be used as the design order of the diffraction grid.

TABLE 3

| Wavelength (nm) | | 405 | 406 | 410 |
|---|---|---|---|---|
| Refractive index | During normal temperature (t = 25° C.) | 1.5466198 | 1.5464526 | 1.5457982 |
| | During increase in temperature (t = 55° C.) | 1.5446228 | 1.5444540 | 1.5437929 |

FIG. 6 is a graph showing a chromatic aberration of magnification in the main scanning direction, which is one of effects in this embodiment (design data shown in Tables 1 to 3 are used). In FIG. 6, a difference between imaging positions in the main scanning direction in the case where a wavelength difference Δλ is set to 5 nm (λ=410 nm) with respect to a reference wavelength (λ=405 nm) is plotted. As compared with a refraction optical element composed of only refraction surfaces without using the diffraction optical element 7, it is apparent that the diffraction optical element 7 has a function for sufficiently correcting the chromatic aberration of magnification.

As described above, although the single beam semiconductor laser 1 is used as the light source means, the chromatic aberration of magnification is corrected. Therefore, even in an optical scanning device using a multi-beam light source for emitting a plurality of light fluxes (for example, three or four light fluxes), a jitter caused in the main scanning direction is reduced, so that a preferable image quality can be achieved.

In the case of the optical scanning device using the multi-beam light source for emitting the plurality of light fluxes, it is possible to obtain an effect that a chromatic aberration of magnification in the main scanning direction due to a wavelength difference in a multi laser and a focal variation on the surface to be scanned which is caused with an increase in temperature are minimized.

Figure 7:
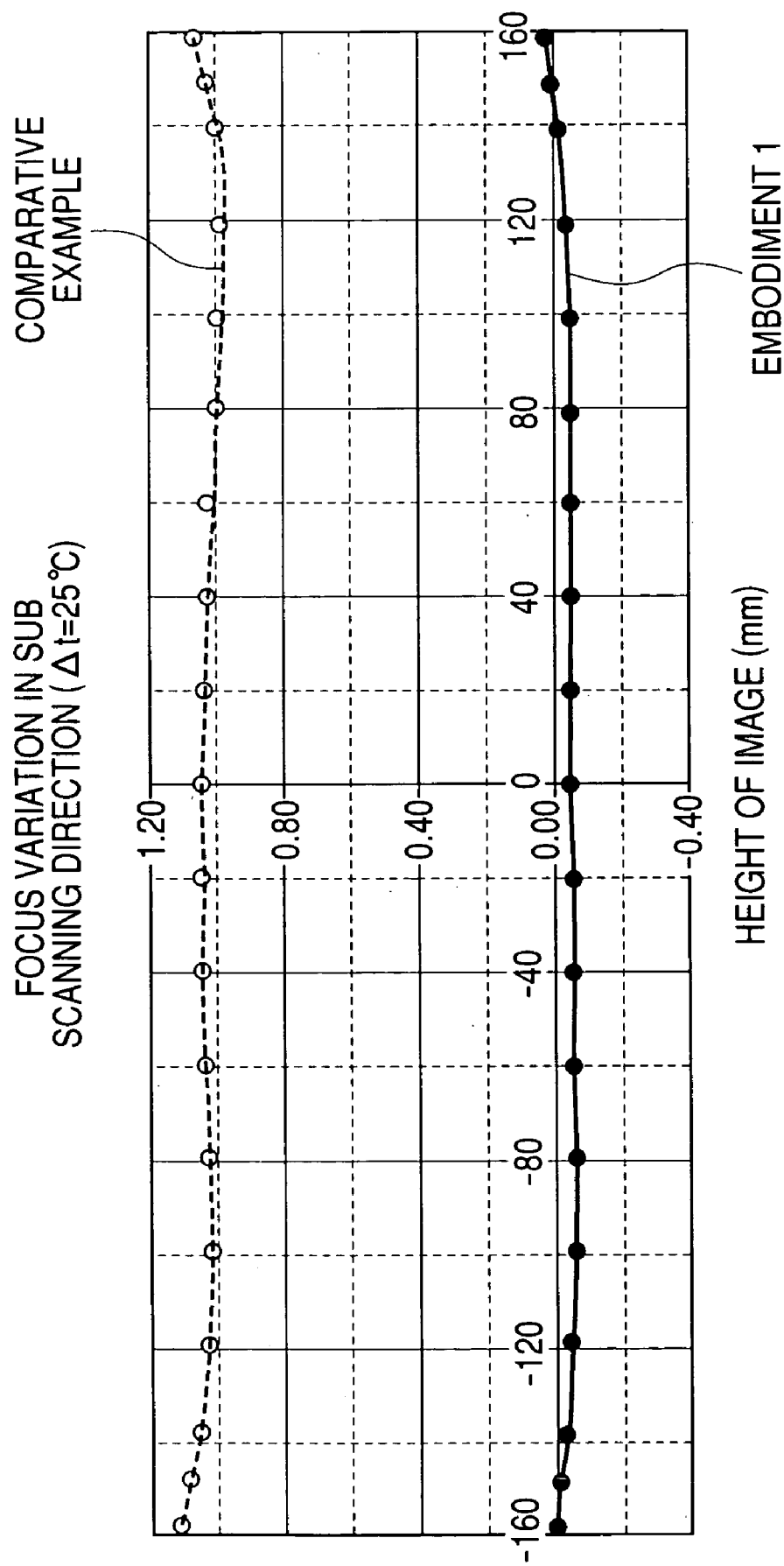
FIG. 7 is a graph showing a focal variation of the scanning optical system in a sub scanning direction in the first embodiment of the present invention.

FIG. 7 is a graph showing an effect obtained by only the scanning optical system with respect to a temperature compensation in the sub scanning direction, which is one of effects in this embodiment (design data shown in Tables 1 to 3 are used). With respect to the temperature compensation, as disclosed in Japanese Patent Application Laid-Open No. H10-197820, a focal variation due to a temperature change of an optical resin (reduction in refraction index of the optical resin, or the like) in the optical scanning device is corrected by a change in power of the diffraction portion resulting from a variation in wavelength of the light source due to the temperature change. In the calculation, a change ratio of the refraction index of the used optical resin (dn/dt) is set to −7.988E−05 and a temperature characteristic of the wavelength of the laser (dλ/dt) is set to 0.04 nm/° C. As compared with a refraction optical element composed of only refraction surfaces without using the diffraction optical element 7, it is apparent from FIG. 7 that the diffraction optical element 7 has a sufficient temperature compensation effect.

As described above, the diffraction order, the number of grids, the effective range, the minimum pitch, the grid depth, and the like in the diffraction optical element are suitably set in the optical scanning device using the short wavelength light source having a wavelength of 500 nm or less. Therefore, it is possible to provide a diffraction optical element in which the grid shape is prevented from by being distorted by the mold cutting process and the mold forming process to reduce the degree of difficulty of manufacturing.

When the chromatic aberration of magnification is corrected using the diffraction optical element and the focal variation due to the temperature change is reduced using the diffraction optical element, it is possible to provide an optical scanning device capable of obtaining a preferable image all the time.

In this embodiment, the diffraction grid is provided on the surface of the diffraction portion in the scanning optical system. The diffraction grid may be provided on a plane. The diffraction grid may be provided on the surfaces of the plurality of lenses in the scanning optical system.

(Second Embodiment)

Figure 8:
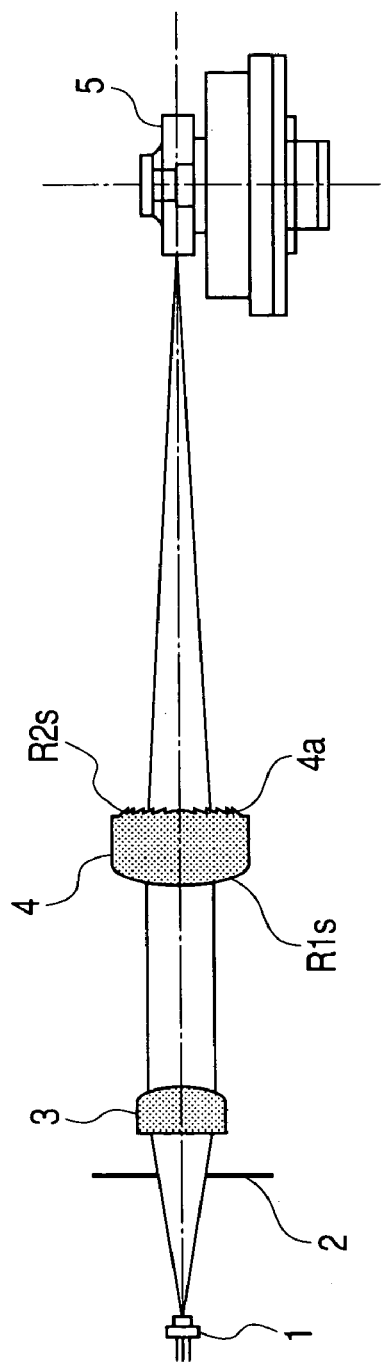
FIG. 8 is a sub scanning sectional view showing an optical scanning device according to a second embodiment of the present invention.

FIG. 8 is an explanatory view showing an optical scanning device according to a second embodiment of the present invention, which shows an embodiment in which a diffraction grid is formed in the cylinder lens 4. In this embodiment, a diffraction grid 4a is formed on an exit surface side of the cylinder lens 4 and has power in only the sub scanning direction. The cylinder lens 4 itself is made of an optical resin and can be produced at low cost by injection molding.

Table 4 shows curvatures of the cylinder lens 4, phase coefficients of the diffraction grid 4a, and the like.

The phase function used here is the same as in the first embodiment.

$$\phi = 2\pi k/\lambda \cdot d0 \cdot Z^2 \ (k=2 \text{ and } \lambda=405 \text{ nm})$$

In this embodiment, the diffraction grid 4a is constructed using the second design order as in the first embodiment.

With respect to the diffraction grid used here, m·L·λ=111 and P/λ=56.35. Therefore, both Expression 1 and Expression 2 are satisfied. When the present invention is applied to the cylinder lens, there is no problem with respect to limitations to the number of grids and the effective width. With respect to the minimum grid pitch, it is necessary to carefully design the diffraction grid as in the first embodiment. Because the grid depth is determined according to the wavelength of the light source, the refraction index of the material, and the diffraction order, there is no relationship with the number of grids and the grid pitch. Therefore, also in view of the grid depth, when the diffraction grid is constructed using the secondary diffraction light, the degree of difficulty of manufacturing is reduced. In this embodiment as well, the grid depth is 1.4818 (μm) as in the first embodiment, so that Expression 3 is satisfied.

Table 4 shows design data in this embodiment.

TABLE 4

|  |  | Second Embodiment | Comparative Example (refraction system) |
|---|---|---|---|
| Incident surface side curvature, radius | R1s | 64.93016 | 24.59789 |
| Exit surface side curvature radius | R2s | ∞ | ∞ |
| Exit surface side phase coefficient | d0 | −3.56742E−03 |  |
| Incident surface to Exit surface | e1 | 6.00 | 6.00 |
| Focal distance in sub scanning direction | fs | 45.00 | 45.00 |
| Focal variation amount at increased temperature of up to 25° C. | Δs | 0 | 0.17356 |
| Effective width of diffraction grid | L | 5.00 | 5.00 |
| Total grid number in diffraction grid | m | 55 |  |
| Minimum pitch of diffraction grid | P | 0.02282 |  |

In this embodiment, the diffraction grid 4a is used for temperature compensation in the sub scanning direction. When the cylinder lens is composed of only refraction surfaces, a position of a focal line near the polygon mirror 5 is shifted to the scanning lens side by 0.17356 mm at an increased temperature of up to 25° C. In contrast to this, the diffraction grid is used for temperature compensation in this embodiment to completely prevent the focal variation.

(Third Embodiment)

Figure 9:
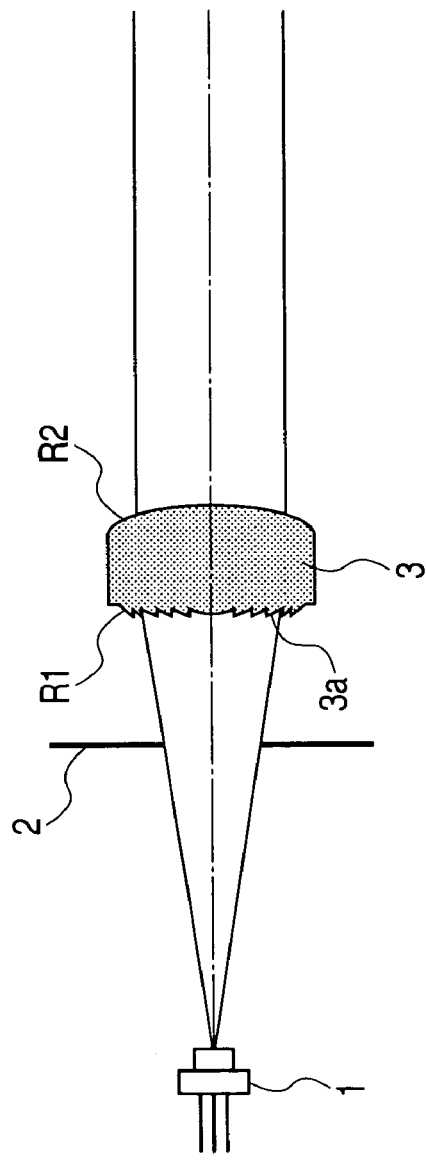
FIG. 9 is a sectional view showing a part of an optical scanning device according to a third embodiment of the present invention.

FIG. 9 is an explanatory view showing a part of an optical scanning device according to a third embodiment of the present invention, which shows an embodiment in which a diffraction grid is formed in the collimator lens 3. In this embodiment, a diffraction grid 3a is formed on an incident surface side of the collimator lens 3. Because of a concentric diffraction grid, although the single collimator lens is used, it becomes an optical system in which an on-axis chromatic aberration is corrected.

Table 5 shows curvatures of the collimator lens 3, phase coefficients of the diffraction grid 3a, and the like.

The phase function used here is the same as in the first embodiment.

$$\phi=2\pi k/\lambda \cdot c0 \cdot H^2, H^2=Y^2+Z^2 \ (k=2 \text{ and } \lambda=405 \text{ nm})$$

In this embodiment, the diffraction grid 3a is constructed using the second design order as in the first and second embodiments.

With respect to the diffraction grid 3a used here, $m \cdot L \cdot \lambda = 47$ and $P/\lambda = 129.60$. Therefore, both Expression 1 and Expression 2 are satisfied. When the present invention is applied to the collimator lens, there is no problem with respect to limitations to the number of grids and the effective width. Even in the minimum grid pitch, the conditional expression is sufficiently satisfied. Because the grid depth is determined according to the wavelength of the light source, the refraction index of the material, and the diffraction order, there is no relationship with the number of grids and the grid pitch. Therefore, also in view of the grid depth, when the diffraction grid is constructed using the secondary diffraction light, the degree of difficulty of manufacturing is reduced. In this embodiment as well, the grid depth is 1.4818 (μm) as in the first and second embodiments, so that Expression 3 is satisfied.

In this embodiment, the diffraction grid is used to correct the on-axis chromatic aberration.

Table 5 shows design data in this embodiment.

TABLE 5

Reverse tracing from exit surface side (parallel light side)

| | | Third Embodiment | Comparative Example (refraction system) |
|---|---|---|---|
| Exit surface side curvature radius | R2 | 12.34417 | 10.9324 |
| Incident surface side curvature radius | R1 | ∞ | ∞ |
| Incident surface side phase coefficient | c0 | −1.56392E−03 | |
| Exit surface to Incident surface | e1 | 3.00 | 3.00 |
| Focal distance | f | 20.00 | 20.00 |
| On-axis chromatic aberration (Δλ = 5 nm) | Δm | 0 | 0.02907 |
| Effective width of diffraction grid | L | 5.00 | 5.00 |
| Total grid number in diffraction grid | m | 23 | |
| Minimum pitch of diffraction grid | P | 0.05249 | |

Figure 10B:
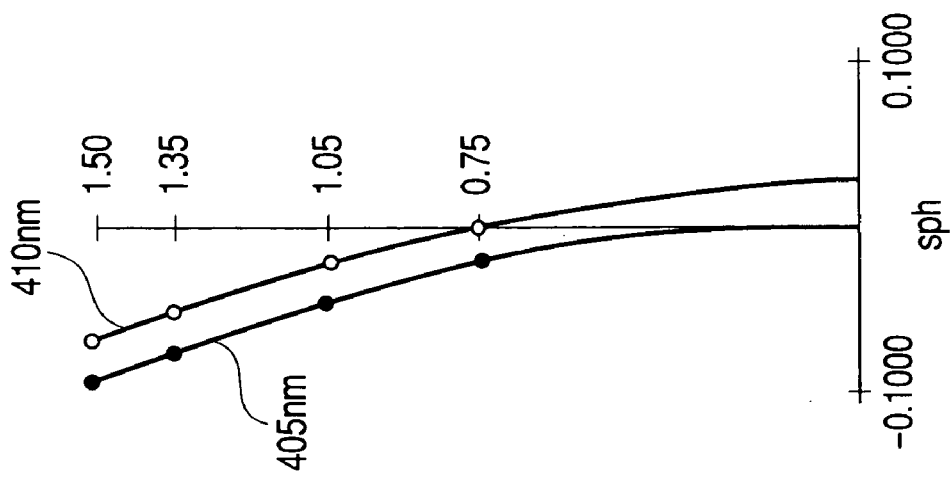
FIGS. 10A and 10B are graphs showing a spherical aberration and an on-axis chromatic aberration in the third embodiment of the present invention.
Figure 10A:
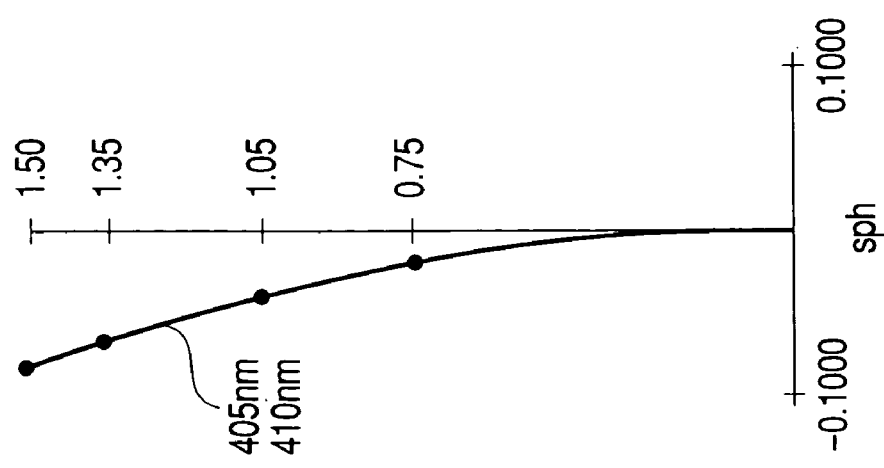

FIGS. 10A and 10B are graphs showing a spherical aberration and an on-axis chromatic aberration of the collimator lens in the case of reverse tracing from the exit surface side (parallel light side) of the collimator lens.

FIG. 10A shows the case where the diffraction grid 3a is formed on the incident surface of the collimator lens. FIG. 10B shows the case of a single lens in which the incident surface and the exit surface each are a refraction surface. When the collimator lens 3 has only refraction surfaces, an on-axis chromatic aberration of 0.029 nm is caused at a wavelength difference of 5 nm. In contrast to this, the diffraction grid 3a is used to correct the chromatic aberration in this embodiment. Therefore, although the wavelength difference of 5 nm is provided, the on-axis chromatic aberration is not caused at all.

Hereinafter, a modified example will be described.

The diffraction grid may be provided for each of the collimator lens 3, the lens 7 in the scanning optical system, and the cylindrical lens 4. The diffraction grid may be provided for two of the collimator lens 3, the lens 7 in the scanning optical system, and the cylindrical lens 4.

(Fourth Embodiment)

Figure 11:
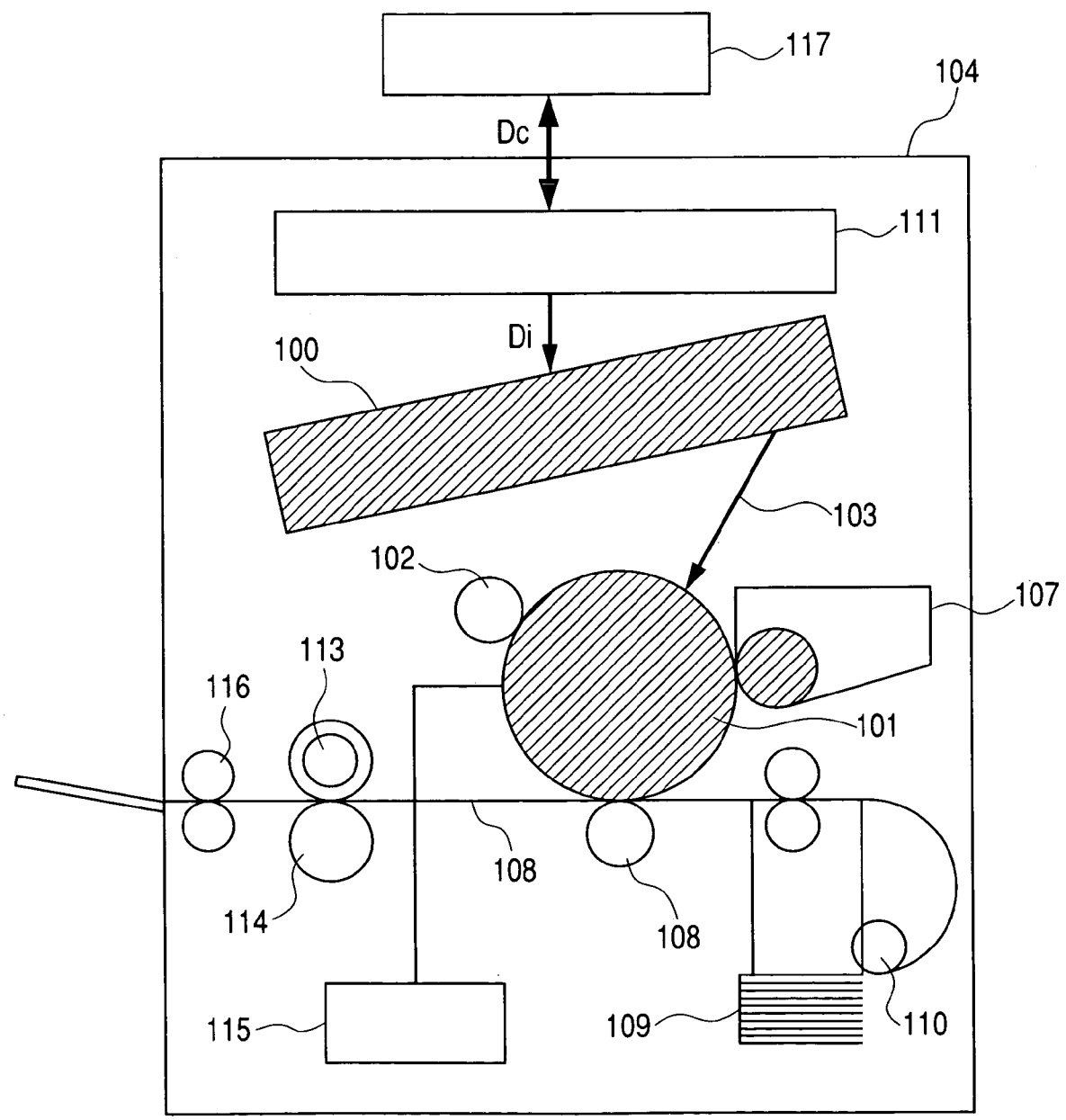
FIG. 11 is a main part schematic diagram showing an image forming apparatus according to the present invention.

FIG. 11 is a main part sectional view in the sub scanning direction, showing an image forming apparatus using the optical scanning device according to the first, second, or third embodiment. In FIG. 11, reference numeral 104 denotes an image forming apparatus. Code data Dc is inputted from an external device 117 such as a personal computer to the image forming apparatus 104. The code data Dc is converted into image data (dot data) Di by a printer controller 111 in the image forming apparatus 104. The image data Di is inputted to an optical scanning unit 100 having the structure indicated in the first, second, or third embodiment. A light beam 103 modulated according to the image data Di is emitted from the optical scanning unit 100. A photosensitive surface of a photosensitive drum 101 is scanned with the light beam 103 in the main scanning direction.

The photosensitive drum 101 serving as an electrostatic latent image bearing member (photosensitive member) is rotated clockwise by a motor 115. According to the rotation, the photosensitive surface of the photosensitive drum 101 is moved in the sub scanning direction orthogonal to the main scanning direction with respect to the light beam 103. A charging roller 102 for uniformly charging the surface of the photosensitive drum 101 is provided on an upper part of the photosensitive drum 101 so as to be contact with the surface thereof. The surface of the photosensitive drum 101 which is charged by the charging roller 102 is irradiated with the light beam 103 scanned by the optical scanning unit 100.

As described earlier, the light beam 103 is modulated according to the image data Di. The surface of the photosensitive drum 101 is irradiated with the light beam 103 to form an electrostatic latent image thereon. The electrostatic latent image is developed as a toner image by a developing device 107 provided in the downstream side from the irradiation position of the light beam 103 in the rotational direction of the photosensitive drum 101 so as to be in contact with the photosensitive drum 101.

The toner image developed by the developing device 107 is transferred onto a sheet 112 serving as a transfer material by a transfer roller 108 provided below the photosensitive drum 101 so as to oppose the photosensitive drum 101. The sheet 112 is contained in a sheet cassette 109 located in the front (right side in FIG. 11) of the photosensitive drum 101. Manual sheet feeding is also possible. A feed roller 110 provided at the end portion of the sheet cassette 109 serves to feed the sheet 112 in the sheet cassette 109 to a transport path.

By the above operation, the sheet 112 to which an unfixed toner image is transferred is further transported to a fixing device located in the rear (left side in FIG. 11) of the photosensitive drum 101. The fixing device is composed of a fixing roller 113 having a fixing heater (not shown) therein and a pressure roller 114 provided so as to press the fixing roller 113. The sheet 112 transported from a transferring part is heated while it is pressurized by a press-contacting part between the fixing roller 113 and the pressure roller 114, so that the unfixed toner image on the sheet 112 is fixed.

Further, a delivery roller 116 is provided in the rear of the fixing roller 113 and the fixed sheet 112 is delivered to the outside of the image forming apparatus 104 by the delivery roller 116.

Although not shown in FIG. 11, the printer controller 111 conducts not only data conversion described earlier but also control of each part of the image forming apparatus 104, which is represented by the motor 115, control of a polygon motor in the optical scanning unit as described later, and the like.

Figure 12:
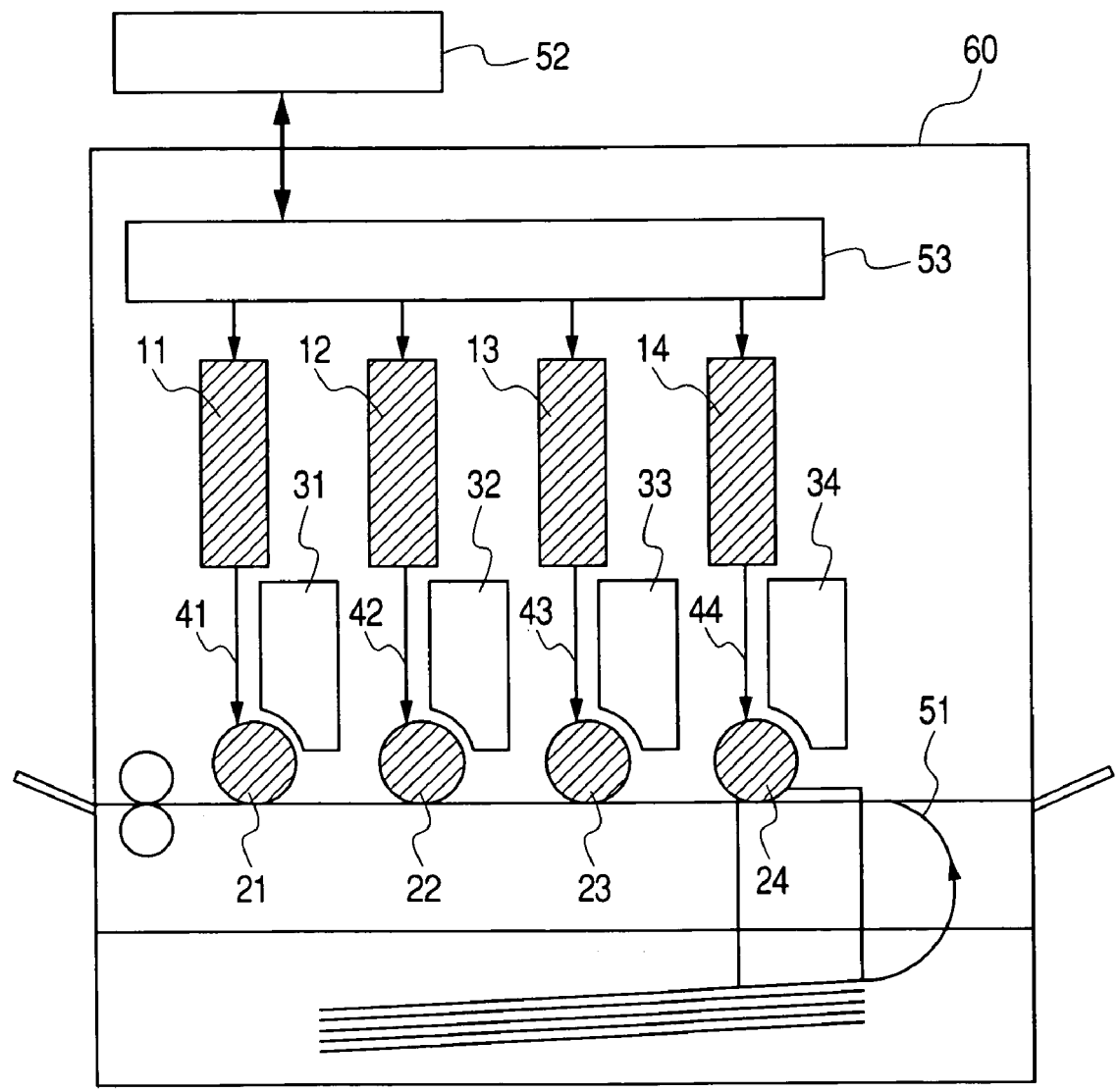
FIG. 12 is a main part schematic diagram showing a color image forming apparatus according to the present invention.
Figure 13:
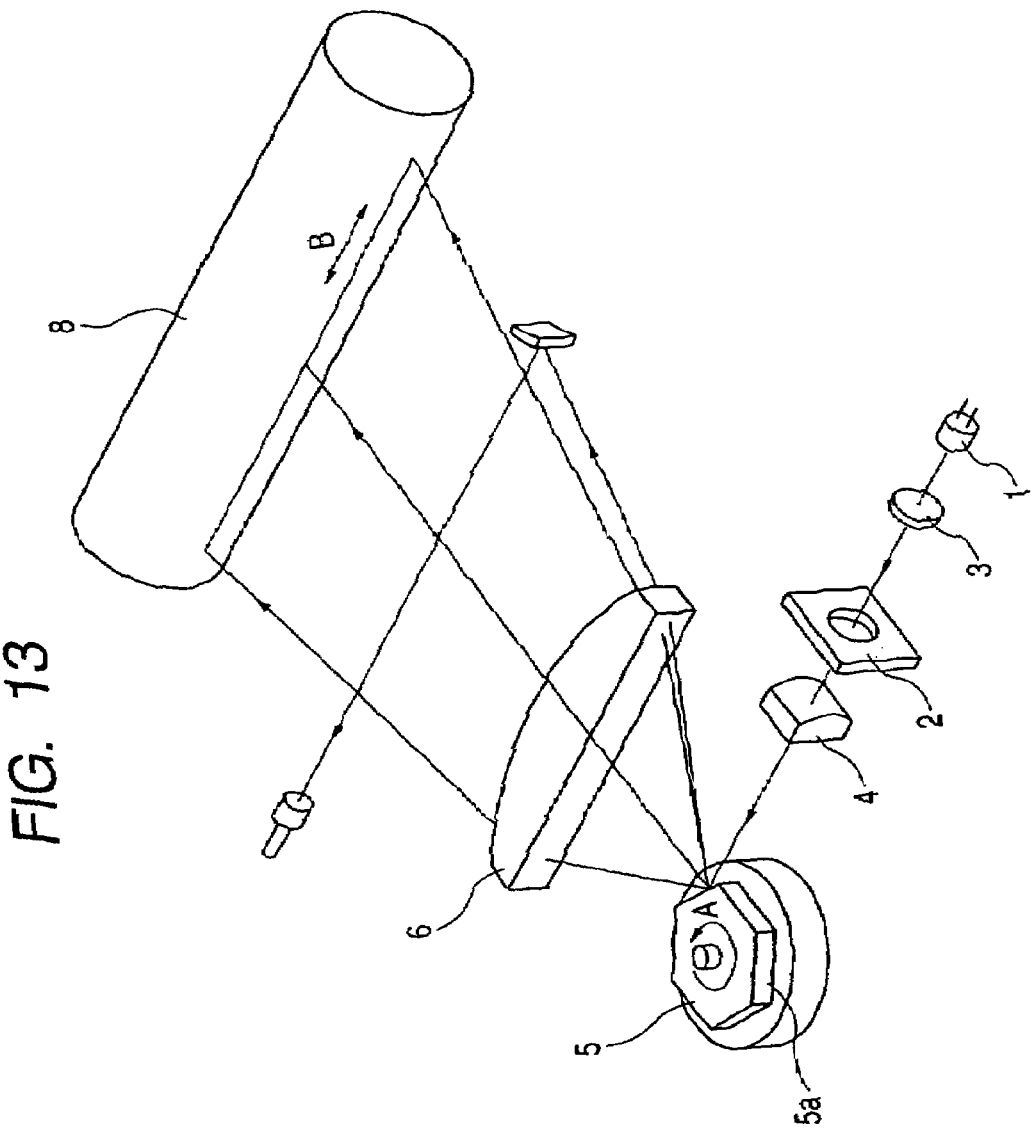
FIG. 13 is a perspective view showing a conventional optical scanning device.
Figure 14:
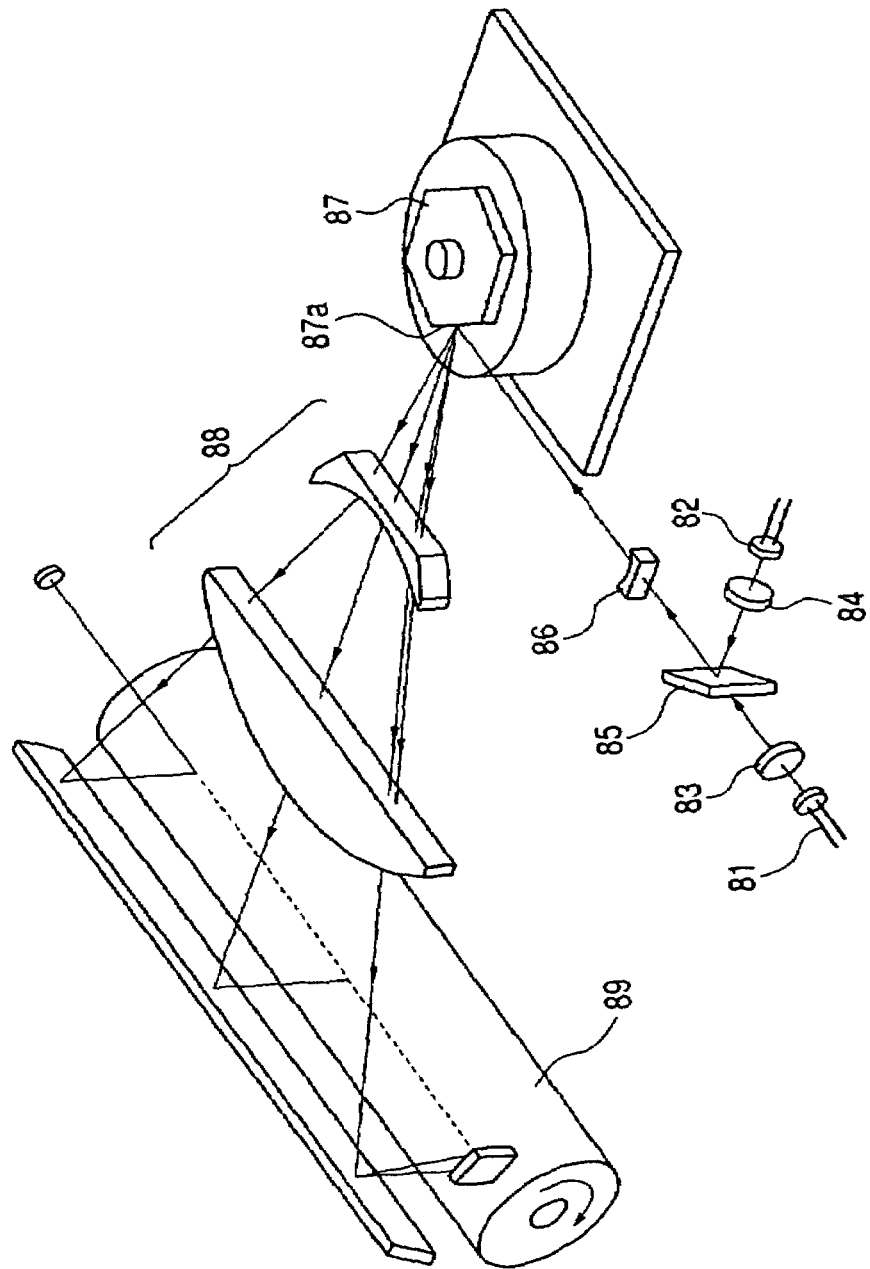
FIG. 14 is a perspective view showing a conventional optical scanning device using a multi-beam light source.

FIG. 12 is a main part schematic diagram showing a color image forming apparatus according to the first, second, or third embodiment of the present invention. This is a tandem type color image forming apparatus in which four optical scanning devices are arranged to record image information in parallel on the surfaces of the photosensitive drums serving as the image bearing members. In FIG. 12, reference numeral 60 denotes a color image forming apparatus; 11, 12, 13, and 14 each denote the optical scanning device having the structure described in the first embodiment; 21, 22, 23, and 24 each denote the photosensitive drums serving as the image bearing members; 31, 32, 33, and 34 each denote a developing device, and 51 denotes a transport belt.

In FIG. 12, respective color signals of R (red), G (green), and B (blue) are inputted from an external device 52 such as a personal computer to the color image forming apparatus 60. The color signals are converted into respective image data (dot data) of C (cyan), M (magenta), Y (yellow), and B (black) by a printer controller 53 in the color image forming apparatus 60. These image data are separately inputted to the optical scanning devices 11, 12, 13, and 14. Light beams 41, 42, 43, and 44 modulated according to the respective image data are emitted from the optical scanning devices 11, 12, 13, and 14. The photosensitive surfaces of the photosensitive drums 21, 22, 23 and 24 are scanned with the light beams in the main scanning direction.

With the color image forming apparatus according to this embodiment, the four optical scanning devices (11, 12, 13, and 14) are arranged, each device corresponding to C (cyan), M (magenta), Y (yellow), and B (black), and the image signals (image information) are recorded in parallel on the surfaces of the photosensitive drums 21, 22, 23 and 24 by the optical scanning devices, thus printing a color image at high speed.

With the color image forming apparatus according to this embodiment, as described above, the latent images of the respective colors are formed on the corresponding surfaces of the photosensitive drums 21, 22, 23 and 24 using the light beams based on the respective image data from the four scanning optical devices 11, 12, 13, and 14. After that, the multi-transfer is conducted on a recording material to produce a full color image.

For example, a color image reading apparatus including a CCD sensor may be used as the external device 52. In this case, the color image reading apparatus and the color image forming apparatus 60 compose a color digital copying machine.

According to the present invention, in the optical scanning device having the diffraction grid, for which the short wavelength light source having a wavelength of 500 nm or less is used, the grid shape can be easily produced by selecting a suitable design order of the diffraction grid.

This application claims priority from Japanese Patent Application No. 2003-208957 filed on Aug. 27, 2003, which is hereby incorporated by reference herein.

What is claimed is:

1. An optical scanning device, comprising:

light source means for emitting at least one light flux having a wavelength of 500 nm or less;

deflecting means for deflecting the at least one light flux emitted from the light source means;

a first optical system for guiding the light flux emitted from the light source means to the deflecting means; and a second optical system for imaging the light flux deflected by the deflecting means on a surface to be scanned, wherein:

one of the first optical system and the second optical system includes a diffraction grating; and provided that the total number of gratings of the diffraction grating is represented by m, an effective range of the diffraction grating is represented by L (mm), a minimum grating pitch of the diffraction grating is represented by P (μm), and the wavelength of the light flux is represented by λ (μm), the following expressions are satisfied:

$$m \cdot L \cdot \lambda < 300000$$

$$30 < P/\lambda.$$

2. An optical scanning device according to claim 1, wherein provided that a diffraction order of the diffraction grating is represented by k, the wavelength of the light flux is represented by λ (μm), and a refraction index of a material composing the diffraction grating is represented by n, the following expression is satisfied:

$$1 < k \cdot \lambda/(n-1) < 5$$

3. An optical scanning device according to claim 1, wherein the design order of the diffraction grating is a second diffraction order.

4. An optical scanning device according to claim 1, wherein the diffraction grating is included in the second optical system.

5. An optical scanning device according to claim 1, wherein the diffraction grating is included in the first optical system, the first optical system further includes a cylindrical lens for temporarily imaging the light flux in a sub scanning direction, and the diffraction grating is formed in the cylindrical lens near a deflection surface of the deflecting means.

6. An optical scanning device according to claim 1, wherein the diffraction grating is included in the first optical system, the first optical system further includes a collimator lens for converting a divergent light flux from the light source means into a substantially parallel light flux, and the diffraction grating is formed in the collimator lens.

7. An optical scanning device according to claim 1, wherein the diffraction grating is produced by mold forming.

8. An optical scanning device according to claim 1, wherein the diffraction grating comprises a blazed type diffraction grating.

9. An optical scanning device according to claim 1, wherein the diffraction grating corrects a chromatic aberration of magnification.

10. An optical scanning device according to claim 1, wherein the diffraction grating corrects a focal variation due to a temperature change.

11. An optical scanning device according to claim 1, wherein the light source means comprises a multi-beam light source for emitting a plurality of light fluxes.

12. An image forming apparatus, comprising:

the optical scanning device according to claim 1;

a photosensitive member that is located on the surface to be scanned;

a developing device for developing, as a toner image, an electrostatic latent image that is formed on the photosensitive member scanned with the light flux by the optical scanning device;

a transfer device for transferring the developed toner image to a transfer material; and a fixing device for fixing the transferred toner image to the transfer material.

13. An image forming apparatus, comprising:

the optical scanning device according to claim 12; and a printer controller that converts code data inputted from an external device into an image signal and outputs the image signal to the optical scanning device.

14. A color image forming apparatus, comprising:

a plurality of optical scanning devices, each of which is the optical scanning device according to claim 1; and a plurality of image bearing members for forming images having colors different from one another, each of which is located on a surface to be scanned in a respective one of the plurality of optical scanning devices.

15. A color image forming apparatus according to claim 14, further comprising a printer controller that converts a color signal inputted from an external device into image data in different colors and outputs the image data to the optical scanning devices.

* * * * *

UNITED STATES PATENT AND TRADEMARK OFFICE
CERTIFICATE OF CORRECTION

| | | |
|---|---|---|
| PATENT NO. | : 7,126,625 B2 | Page 1 of 1 |
| APPLICATION NO. | : 10/921853 | |
| DATED | : October 24, 2006 | |
| INVENTOR(S) | : Hidekazu Shimomura et al. | |

It is certified that error appears in the above-identified patent and that said Letters Patent is hereby corrected as shown below:

COLUMN 7:
Line 26, "defection" should read --deflection--.
Line 58, "Suffios" should read --Suffixes--.
Line 59, "Suffios" should read --Suffixes--.

COLUMN 14:
Line 35, "contact" should read --in contact--.

Signed and Sealed this

Thirteenth Day of November, 2007

JON W. DUDAS
*Director of the United States Patent and Trademark Office*